United States Patent [19]

Purchas

[11] 4,226,723
[45] Oct. 7, 1980

[54] FILTRATION APPARATUS

[75] Inventor: Derek B. Purchas, Woking, England

[73] Assignee: National Research Development Corporation, London, England

[21] Appl. No.: 955,243

[22] Filed: Oct. 27, 1978

[30] Foreign Application Priority Data

Nov. 4, 1977 [GB] United Kingdom ............... 45966/77

[51] Int. Cl.² ..................... B01D 23/24; B01D 29/04; B01D 35/22; B01D 46/04
[52] U.S. Cl. .................................. 210/332; 210/445; 210/447; 210/388; 210/521; 55/304; 55/481; 55/484; 55/494; 55/501
[58] Field of Search ................. 55/282, 299, 300, 304, 55/305, 481, 484, 486, 494, 501, 523, 527; 210/323 R, 332, 407, 445, 447, 388, 521, 226–229, 231; 209/316, 318, 323, 381, 405

[56] References Cited

U.S. PATENT DOCUMENTS

| 2,332,780 | 10/1943 | Cecka | 209/323 |
|---|---|---|---|
| 2,467,346 | 4/1949 | Trubenbach | 55/494 |
| 2,554,343 | 5/1951 | Pall | 55/523 |
| 2,901,109 | 8/1959 | Eppenberger | 209/316 |
| 3,090,180 | 5/1963 | Berz et al. | 55/484 |
| 3,353,982 | 11/1967 | Blaha | 55/523 |
| 3,565,251 | 2/1973 | Pennington | 209/381 |
| 3,587,213 | 6/1971 | Tamny | 55/304 |
| 3,805,494 | 4/1974 | Kroll | 55/304 |
| 3,875,065 | 4/1975 | Rosenblum | 55/511 |
| 3,880,625 | 4/1975 | Shook | 55/511 |
| 4,036,612 | 7/1977 | Guttmann | 55/282 |

FOREIGN PATENT DOCUMENTS

| 2548934 | 5/1977 | Fed. Rep. of Germany | 55/486 |
|---|---|---|---|
| 347190 | 2/1905 | France | 55/484 |
| 521061 | 11/1938 | United Kingdom . | |
| 548883 | 10/1942 | United Kingdom | 55/481 |

Primary Examiner—David L. Lacey
Attorney, Agent, or Firm—Cushman, Darby & Cushman

[57] ABSTRACT

Filtration apparatus in which the filter medium is mounted at a slope with respect to the horizontal and in which there are means to vibrate the medium in a horizontal direction to assist the cleaning of the medium. A single chamber may contain many sheets of media, one version of the apparatus comprises a plurality of separate modular structures each containing at least one filter medium and in another version modular structures are so designed that they assemble into a stack and when so assembled form the necessary conduits by which each filter medium communicates with the necessary inlets and outlets for the relevant materials.

9 Claims, 8 Drawing Figures

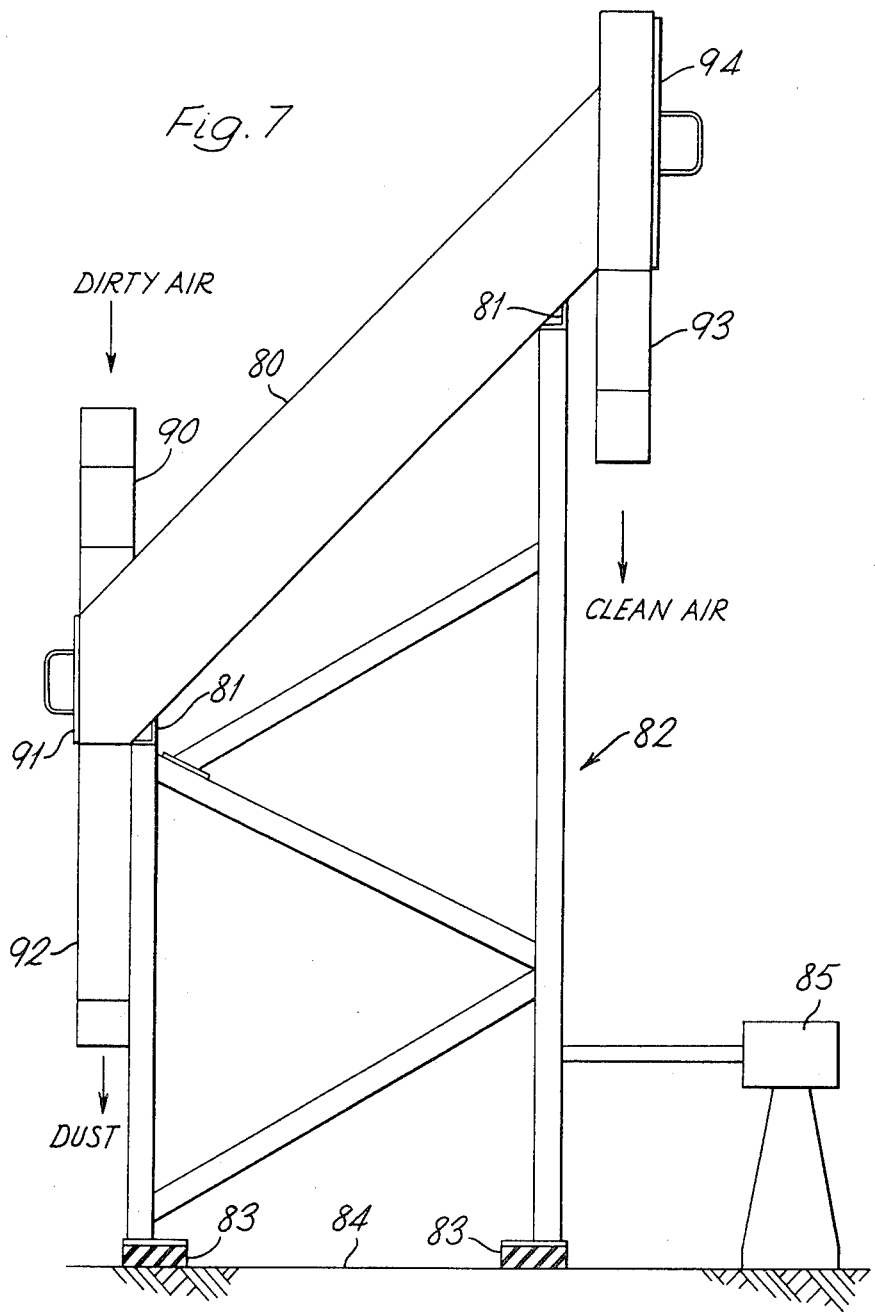

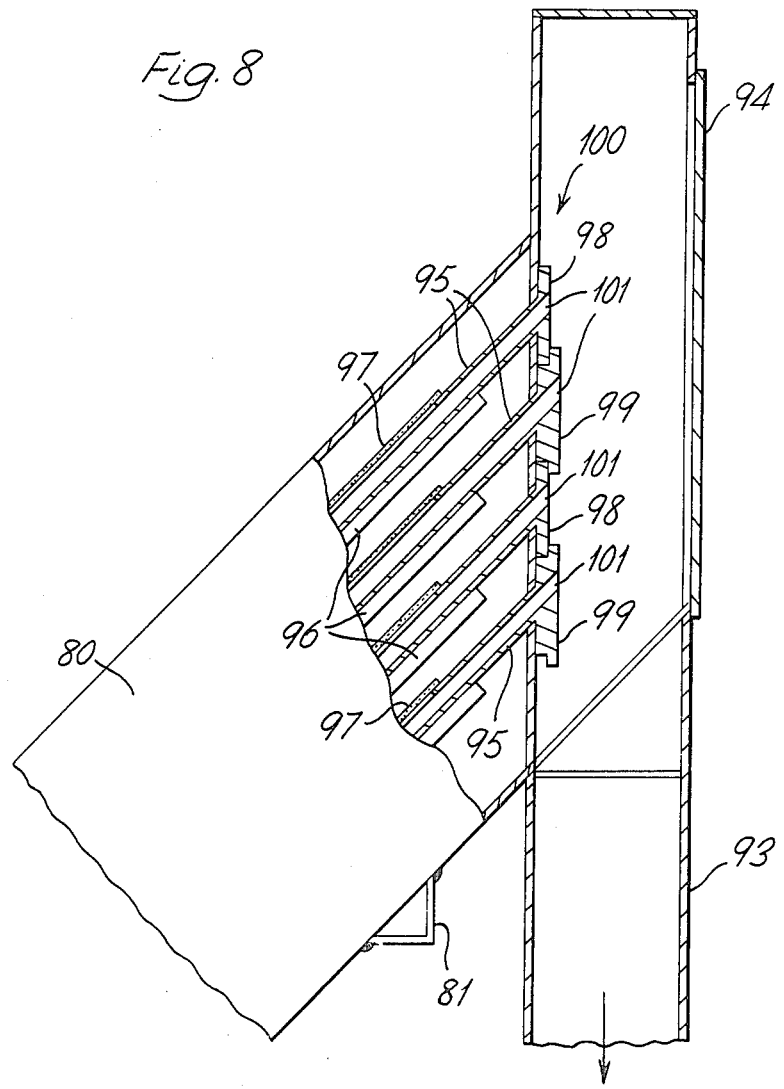

1

FILTRATION APPARATUS

This invention relates to filtration apparatus for separating gas/solid mixtures, and in particular to means for clearing the accumulated materials or other solid residue that gathers upon the cloth or other filter medium of apparatus for separating solid/gas mixtures; for example removing dust from air. It is known to clear filter media periodically by vibrating them, so that the solid is shaken off them and then falls through the filtering chamber to a solid outlet by gravity. Such cleaning methods are known, for example, in connection with apparatus where the filtering media are in the form of hanging, flexible, tubular bags; here mechanical shaking is the most common method of clearing the filter media, often alone but sometimes accompanied by reverse flow of the gas. Vibrations have often been applied or augmented by directing sharp pulses of high-pressure gas into the interior of the bags. Of various disadvantages of this form of cleaning that have become apparent, two in particular will now be noted. First that where a filter medium is unevenly tensioned, as it will be when it simply hangs free or is otherwise loosely supported or even if it is subjected to tension between top and bottom, it will tend to clear unevenly when vibrated. Second that residue shaken free into the atmosphere of the chamber where the media are mounted may take a long time to fall under gravity, and may therefore not have reached the outlet by the time filtration starts again, the solids that are still falling will tend to be drawn back on to the media.

My invention involves a novel arrangement and orientation of filter media, leading to improved performance under vibration. The invention is defined by the claims at the end of this specification and will now be described by way of example, with reference to the accompanying drawings in which:

BRIEF DESCRIPTION OF THE DRAWINGS

FIG. 7 is a side elevation of another embodiment of an apparatus according to the invention, and FIG. 8 is a vertical section through part of the apparatus of FIG. 7.

DETAILED DESCRIPTION OF THE DRAWINGS

Figure 1:
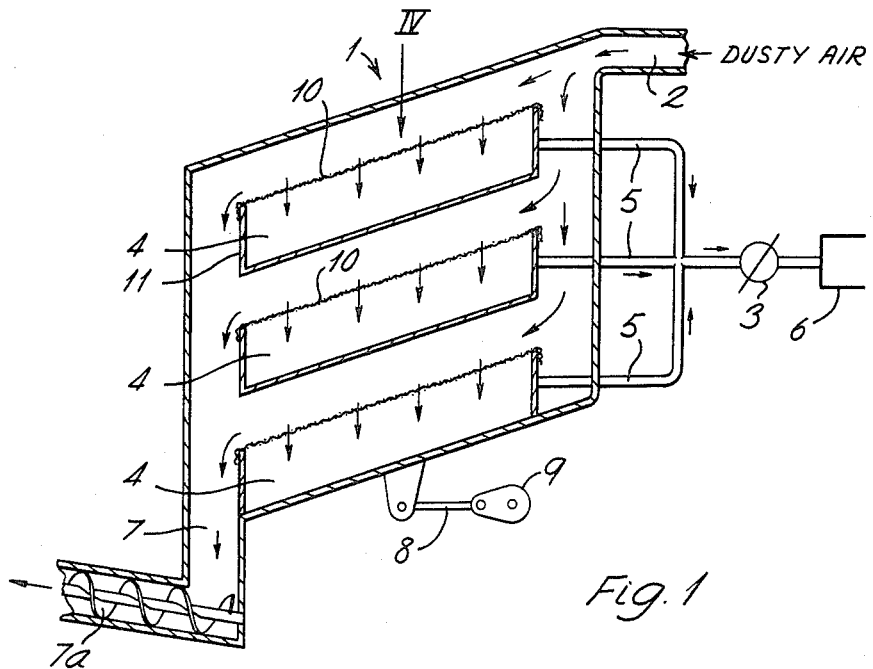
FIGS. 1-3 show three different forms of dust filtration apparatus, each in diagrammatic vertical section.
Figure 2:
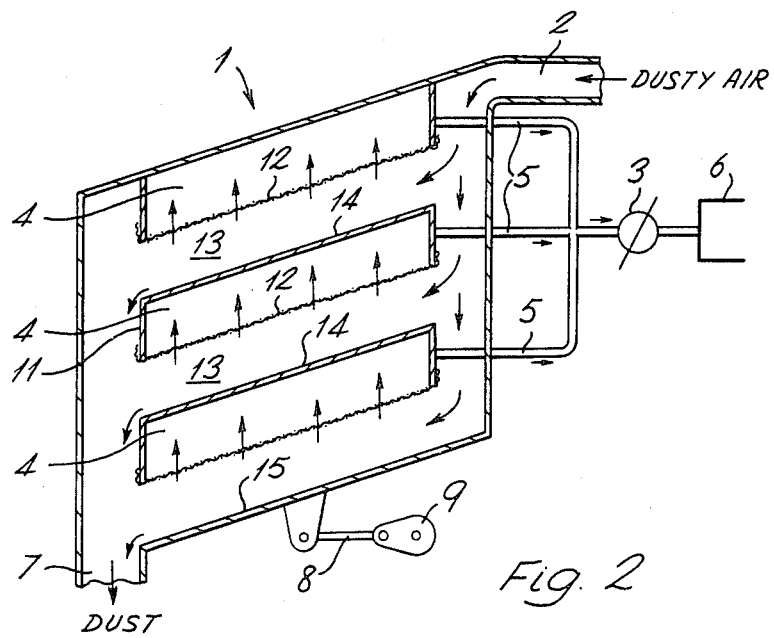

Each of FIGS. 1 and 2 shows apparatus comprising a chamber 1 with an inlet 2 to which dust-laden air is drawn by a suction pump 3, a stack of three box-like structures 4 the interiors of which are connected by conduits 5 by way of the pump 3 to a clean air outlet 6, and a dust outlet 7 including a screw powered conveyor 7a. Alternatively the outlet could be fitted with a rotary valve; in a small unit the outlet might contain only a simple valve which would be opened peridocally to discharge the accumulated solid into a hopper by gravity. Boxes 4 are secured to the walls of the casing 1 by means not shown, and a shaft 8 links the body of the chamber to a vibrator, for instance an eccentric mechanism 9 whereby the chamber, and the boxes within it, may be vibrated in a generally horizontal direction. The top and bottom surfaces of the boxes 4 are inclined to the horizontal at an angle of about 20°. The best direction for the vibrations will depend upon the individual apparatus being used; horizontal or vertical vibrations are both possible, and the same direction of vibration may not be best for both clearing the medium and conveying the solid from it. Vibration parallel to the slope of the medium may be particularly useful for dislodging solids without "throwing" it.

In FIG. 1, filter medium 10 is positioned across the top of each box 4, being supported at its edges by the rims of the walls 11 of the boxes and being stretched evenly, in both width and length, by means not shown. Typically, the chamber will be at rest and mechanism 9 inactive while filtration proceeds and a cake of dust builds up on each top surface 10. Then when inflow of dirty air is interrupted and vibrating mechanism 9 started, the dust particles will tend to slide down each surface 10 to its lower edge, where they are closest to dust outlet 7 and may fall into that outlet with the minimum chance of spreading into the general atmosphere of the chamber when vibration stops and filtration begins again.

Figure 3:
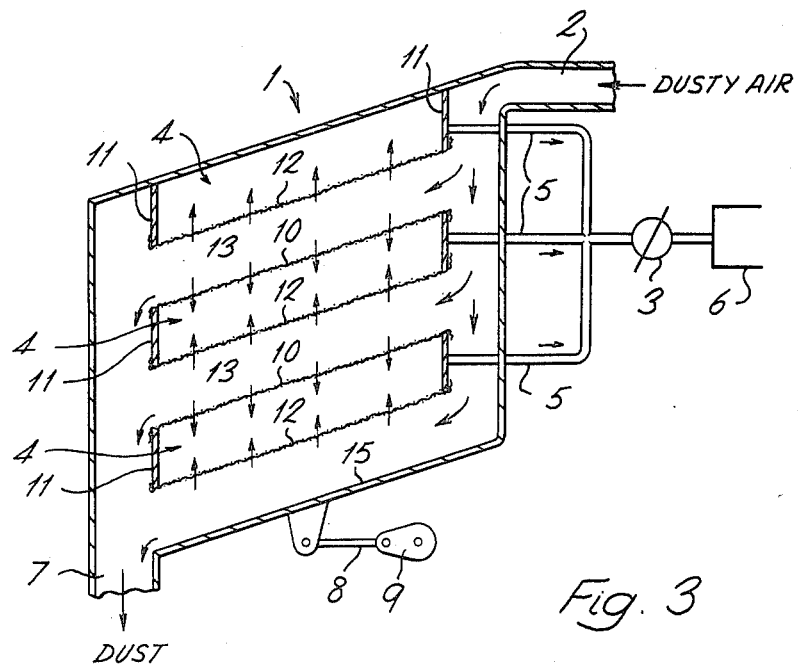

In FIG. 2 the sheet of filter medium is positioned across the bottom surface 12 of each box 4 and during filtration an adhering cake of dust builds up on the underside of each such surface. When vibration begins, these cakes are shaken free and fall quickly under gravity through spaces 13, which should be kept as small as possible, on to the impermeable top surface 14 of the box beneath, down which they slide towards outlet 7 as described with reference to FIG. 1. In FIG. 3 the filter medium is positioned across only the bottom surface 12 of the top box, but is positioned across both the top and bottom surfaces 10 and 12 of the two other boxes. When vibration begins, dust falls from the bottom surfaces of the top and middle boxes on to the surfaces 10 beneath, where it joins the cakes that have already formed there; the augmented cake then slides down those surfaces as deacribed above. The bottom surface 12 of the top box discharges its own cake only on to surface 10 of the box beneath. The cake from the bottom surface 12 of the bottom box falls on to the base 15 of the chamber, as it does in FIG. 2 also.

Figure 4:
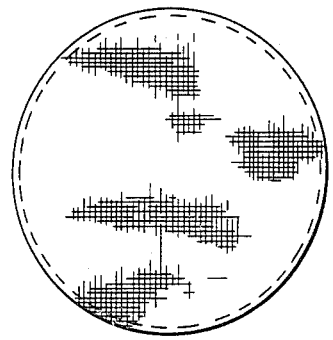
FIG. 4 is a diagrammatic plan view of yet another filtering structure.

FIG. 4 illustrates a further possible way of arranging the boxes and the media that they support. This Figure, which is a view as taken in the direction of arrow IV in FIG. 1, shows a flexible medium stretched over the upper rim of a box with a circular bottom and cylindrical side wall. Where the medium is flexible, for instance typically a woven cloth, this construction of box and wall facilitate maintaining even tension in the cloth and thus of uniform filtering characteristics.

Figure 5:
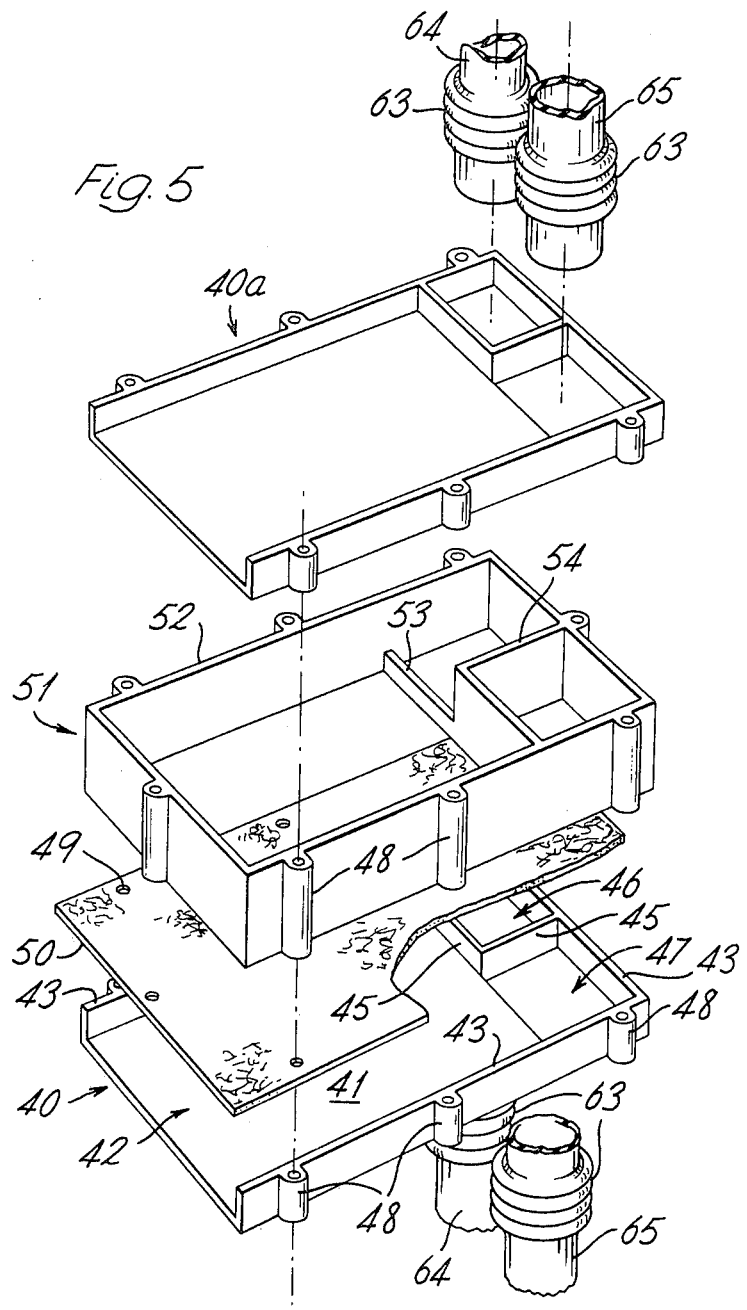
FIG. 5 is an exploded perspective view of part of a stack of structures for use in yet another apparatus.
Figure 6:
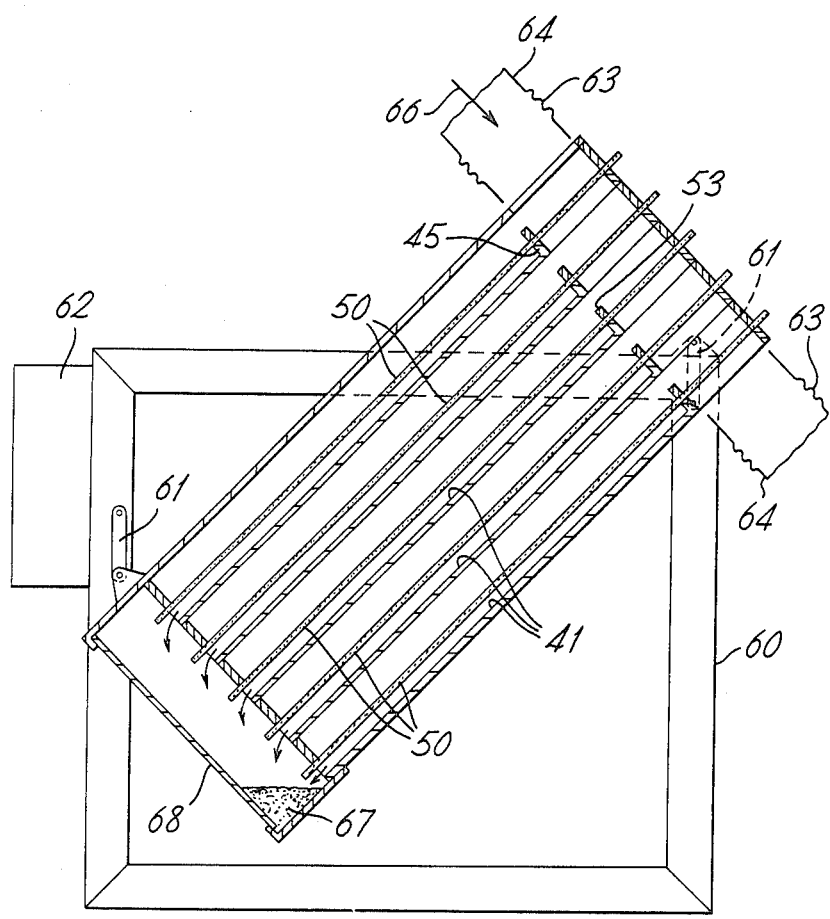
FIG. 6 shows the apparatus of FIG. 5 in section.

In the embodiments already described, each box-like structure has been separated from all the others, although all the boxes have been mounted on the same vibrating frame. FIGS. 5 and 6 show an alternative construction more akin to the traditional filter press in which successive modules, made up of standard parts and each containing a sheet of filter medium, are assembled into a stack. FIG. 5 shows the units of one such module: these include a tray-like base unit 40 having a bottom surface or floor 41 and one side 42 open, the other three sides being enclosed by a wall 43. Floor 41 is omitted from the part of the unit (comprising corner areas 46 and 47) furthest from open end 42, the floor terminating at edge 44. An internal wall 45 separates corner area 46 from the rest of the unit, and sleeves 48 formed on the outer surface of wall 43 are to receive bolts by which the assembled units and modules of the stack will be held together.

Above unit 40 in the module fits a sheet 50 of filter medium, covering the entire plan area of unit 40.

Next comes an open-bottomed, open-topped unit 51; here, in contrast to unit 40, the side wall 52 is continuous around the unit, corner 46 communicates with the rest of the unit over a low wall 53 but corner 47 is separated by a wall 54. As with unit 40, sleeves 48 to accommodate clamping bolts are formed in the outer face of wall 52.

The three units just described make up one module, and FIG. 5 also shows the bottom unit (40a) of the next module. FIG. 6 shows an assembled stack of five such modules, clamped together by bolts (not shown) passing through the sleeve 48 of units 40 and 51 and registering holes 49 of filter sheets 50. The stack is mounted in a rigid frame 60 so that the filter sheets 50 lie at an angle of about 45° to the horizontal, and vibration including both horizontal and vertical components of direction is achieved by mounting the stack on swinging links 61 driven by a vibrator 62 fixed to the frame. By alteration of the linkage the direction of vibration could of course be changed, for instance to one more nearly horizontal, or more nearly parallel with the surfaces of sheets 50. Corners 46, 47 of the assembled stack are connected, by way of flexible bellows 63 to allow for the vibration to clean air and dirty air ducts 64 and 65 respectively. Duct 64 is shown in section in FIG. 6, and the disposition of both ducts is shown diagrammatically in FIG. 5. In operation, dirty air may travel in the obliquely upward direction within duct 65, entering each unit 40 through corner 47, but the corresponding corner of each unit 51 is blanked off by wall 54, which ensures both that the dirty air has direct acress to all the units 40 in the stack (not just the bottom one) and that dirty air is excluded from all the units 51.

Once inside each unit 40, the dirty air strikes the underside of filter sheet 50 which retains the dirt, allowing clean air to pass through the sheet into unit 51, from which it escapes over low wall 53 into corner 46 and so to duct 64, in which the clean air moves in the obliquely-downward direction indicated by the arrow 66 in FIG. 6 where duct 64 is shown in section. When dislodged by vibration, the dirt which has been caught by the underside of sheet 50 falls on to the floor 41 of units 40 and thence from the open end 42 of the units into the bottom corner 67 of a dust box 68 formed at the lower termination of the stack.

FIGS. 7 and 8 of the drawings show another form of apparatus according to the invention, comprising a sloping chamber 80 formed with supporting runners 81. The runners are mounted on a gantry 82 made up of angle-section members. Rubber blocks 83 are interposed between gantry 82 and the floor 84, and allow gantry and chamber to vibrate horizontally when driven by the vibrator diagrammatically shown at 85. This vibrator may take the form, for instance, of a rotor driven by compressed air and communicating with gantry 82 by way of an eccentric device; such a vibrator has the advantage that it is relatively easy to alter either amplitude or frequency independently of each other. A different arrangement of the supports of the gantry and of the vibrator could of course cause the vibrations to operate in a different direction, for instance parallel to the slope of chamber 80.

Chamber 80 has a dirty air inlet 90, an inspection door 91, a dust collection outlet 92, a clean air outlet 93 and a further inspection/access door 94. Inside chamber 80, as FIG. 8 shows, a plurality of trays 95 are arranged one above the other, and supported like a stack of drawers by runners 96 themselves fixed to opposite vertical walls of the chamber. Each tray 95 has a hollow interior bounded by walls which are solid except for the uppermost sloping face which supports a sheet 97 of filter medium, and the vertical wall at the top right-hand end of the chamber as seen in FIG. 8. In FIG. 8 the upper and lower edges of the end plates 98, 99 of alternate trays 95 are differently flanged so that when the trays 95 are in place they complete a continuous left-hand wall 100 of clean air outlet 93, so that the outlet only communicates with the rest of chamber 90 by way of an orifice 101 which is formed in each end plate 98, 99 and communicates only with the interior (accessible to clean air only) of the corresponding tray 95. This interleaving construction of plates 98 and 99 may be achieved simply when the trays 95 are first slid into place with door 94 removed, by first putting in place all those trays with end plates of type 98 and then all those with type 99. The construction of FIGS. 7 and 8 could of course be modified so that the sheet 97 faces the dirty air downwardly (as in FIG. 2) or so that each tray carried two sheets, one facing downwardly and the other upwardly (as in FIG. 3).

The angle of slope of the filter medium has been specified for the apparatus of FIGS. 1 and 2, and 5 and 6. However these are not suggested as typical angles, and in general where the medium faces upwardly towards the dirty air a relatively steep slope (making an angle of at least 30° and preferably 60° to the horizontal, say) may be expected to be beneficial, a less steep slope may be best where the filter medium faces the dirty air downwardly as in FIG. 2.

Intermittent vibratory cleaning of the filter media has been described. The alternative use of continuous vibration to maintain the media clean while filtration proceeds depends upon an important difference in the filtration mechanism and hence a different type of filter medium. The apparatus already described is based upon current fabric filter technology, in which a thin layer of solid material or cake builds up on the surface of the filter fabric during the first few minutes of filtration; only after the formation of this layer does the filter begin to function properly, since a significant fraction of the dust in the incoming air may penetrate the relatively coarse fabric during those first few minutes. If continuous cleaning is to take place, the formation of such a discernable layer of "cake" of dust must be prevented at any stage; therefore the filter medium, whether of fabric or of some other material, must itself be sufficiently fine to prevent penetration of dust. As an example media such as membranes or the highest grade of sintered metal with submicron pore sizes may be used.

In a further alternative type of apparatus to which the invention can be applied, the collected dust may be discharged continuously as a concentrated suspension in air instead of a solid phase alone. Thus 1% or some other small proportion of the incoming air may leave with the dust, the remaining 99% or so passing through the media to be discharged at outlet 6 (FIGS. 1-3) as cleaned air. This form of filtration might be particularly useful, for example, for retaining catalyst within a catalytic cracker.

Although described with reference only to the filtering of dust from air, the invention may apply also to the filtering of solids from liquid, such as ultrafiltration, in which the vibration might be continuous, or even the separation of coarse and fine solids.

I claim:

1. Apparatus for filtering and separating a solid from a fluid comprising:

a chamber, an inlet to said chamber for a solid-bearing fluid, a solids outlet from said chamber for collected solids;

a plurality of filter units mounted and arranged within said chamber in parallel between said inlet and said solids outlet, each such filter unit being a box-like structure comprising walls enclosing a hollow interior, at least one wall being formed by a sheet of filter medium and the remainder of said walls preventing access of said solid-bearing fluid to the interior of said structure, each filter unit having an outlet communicating from the interior thereof for discharging the filtered fluid;

means for removing the filtered fluid from the interior of said filter units, said sheets of filter medium presenting a first surface facing outward into said chamber, a second surface facing inward into said hollow interior, said sheets of filter medium being set at an angle of slope to the horizontal and arranged so that fluid passes through the thickness of each said sheet from said first surface thereof to said second surface, leaving substantially all filtered solids retained on said first surface, means to vibrate said filter units, the vibrations assisting to dislodge the retained solids from said first surfaces of said sheets of filter medium, said sheets of filter medium being sloped such as to have one end adjacent said solids outlet, and said plurality of filter units being arranged such as to define paths for sliding gravity travel of said dislodged solids towards said solids outlet whereby said solids travel by gravity while substantially avoiding solids rising appreciably into the atmosphere of said chamber.

2. The apparatus according to claim 1 in which the angle of slope to the horizontal of said sheets of filter medium is not greater than 60°.

3. The apparatus according to claim 1 in which said vibrating means creates oscillations parallel to the surfaces of said filter medium sheets.

4. The apparatus according to claim 1 in which the vibrating means creates substantially horizontal vibrations.

5. The apparatus according to claim 1 in which said sheet of filter medium forms the top wall of said structure.

6. The apparatus according to claim 1 in which said sheet of filter medium forms the bottom wall of said structure.

7. Apparatus for filtering and separating a solid from a fluid comprising:

a chamber, an inlet to said chamber for a solid-bearing fluid, an outlet from said chamber for filtered fluid, a solids outlet from said chamber for collected solids;

a plurality of filter units mounted, stacked and arranged within said chamber in parallel in fluid communication with said inlet and said filtered fluid outlet, each said filter unit being a box-like structure comprising walls enclosing a hollow interior, at least one wall being formed by a sheet of filter medium and the remainder of said walls preventing access of said solid-bearing fluid to the interior of said structure, said sheets of filter medium presenting a first surface facing outward, a second surface facing inward into said hollow interior, means providing communication between each of said filter units and said outlet, said sheets of filter medium being set at an angle of slope to the horizontal and arranged so that fluid passes through the thickness of each said sheets from said first surface thereof to said second surface, leaving substantially all filtered solids retained on said first surface, means to vibrate said filter units, the vibrations assisting to dislodge the retained solids from said first surfaces of said sheets of filter medium, said sheets of filter medium being sloped such as to have one end adjacent said solids outlet, and said plurality of filter units being arranged such as to define paths for sliding gravity travel of said dislodged solids towards said solids outlet whereby said solids travel by gravity while substantially avoiding solids rising appreciably into the atmosphere of said chamber.

8. The apparatus according to claim 7 in which said units have interfitting faces, said communications means comprising an orifice formed in each of said faces and communicating with said hollow interior of said unit, and in which said interfitted faces containing said orifices form an orificed wall between said outlet for filtered fluid and said sheets of filter medium.

9. The apparatus according to claim 7 in which said box-like structures are modular units assembled into a stack.

* * * * *